United States Patent
Bäckvall et al.

(10) Patent No.: US 10,699,567 B2
(45) Date of Patent: Jun. 30, 2020

(54) METHOD OF CONTROLLING A TRAFFIC SURVEILLANCE SYSTEM

(71) Applicant: Kapsch TrafficCom AB, Jönköping (SE)

(72) Inventors: Johan Bäckvall, Bankeryd (SE); Ulf Ärlig, Habo (SE); Björn Crona, Jönköping (SE); Christian Karlström, Jönköping (SE)

(73) Assignee: Kapsch TrafficCom AB, Jönköping (SE)

( * ) Notice: Subject to any disclaimer, the term of this patent is extended or adjusted under 35 U.S.C. 154(b) by 0 days.

(21) Appl. No.: 15/529,942

(22) PCT Filed: Nov. 27, 2015

(86) PCT No.: PCT/EP2015/077862
§ 371 (c)(1),
(2) Date: May 25, 2017

(87) PCT Pub. No.: WO2016/083553
PCT Pub. Date: Jun. 2, 2016

(65) Prior Publication Data
US 2017/0330454 A1    Nov. 16, 2017

(30) Foreign Application Priority Data
Nov. 27, 2014 (EP) .................................. 14195255

(51) Int. Cl.
*G08G 1/04*     (2006.01)
*G06T 7/593*   (2017.01)
(Continued)

(52) U.S. Cl.
CPC ........... *G08G 1/04* (2013.01); *G06K 9/00771* (2013.01); *G06T 7/285* (2017.01); *G06T 7/593* (2017.01);
(Continued)

(58) Field of Classification Search
CPC ........... G08G 1/04; G06T 7/285; G06T 7/593; G06T 2207/10012; G06T 2207/30232; G06T 2207/30236; G06K 9/00771
See application file for complete search history.

(56) References Cited

U.S. PATENT DOCUMENTS 5,065,236 A * 11/1991 Diner .................. H04N 13/341
                                                                    348/54
5,521,633 A *   5/1996 Nakajima .............. B60Q 9/008
                                                                   348/118
(Continued)

FOREIGN PATENT DOCUMENTS

DE      19640938 A1 *  4/1998  ............... G08G 1/04
DE      19640938 A1 *  4/1998  ............... G08G 1/04
(Continued)

OTHER PUBLICATIONS

International Search Report and Written Opinion received for PCT Patent Application No. PCT/EP2015/077862, dated Jan. 13, 2016, 11 pages.
(Continued)

*Primary Examiner* — Pinalben Patel
(74) *Attorney, Agent, or Firm* — Fiala & Weaver P.L.L.C.

(57) ABSTRACT

The present disclosure relates to a method of controlling a traffic surveillance system. The method comprises the steps of: capturing first images and second images over time by a plurality of the stereoscopic sensors; processing, by the processing unit, a first image and a second image from a first stereoscopic sensor of the plurality of the stereoscopic sensors to produce a first height image; analyzing said first height image to detect a moving object such as a vehicle located within the primary view; and analysing a part of a primary view of at least a first image, a second image or a combination of the first image and the second image captured by a second stereoscopic sensor based on the detected (Continued)

moving object in said first height image to determine a characteristic of the moving object.

20 Claims, 8 Drawing Sheets

(51) Int. Cl.
*G06T 7/285* (2017.01)
*G06K 9/00* (2006.01)

(52) U.S. Cl.
CPC .............. *G06K 2209/23* (2013.01); *G06T 2207/10012* (2013.01); *G06T 2207/30232* (2013.01); *G06T 2207/30236* (2013.01)

(56) References Cited

U.S. PATENT DOCUMENTS

| | | | |
|---|---|---|---|
| 6,195,019 B1 | 2/2001 | Nagura | |
| 6,212,468 B1* | 4/2001 | Nakayama | G08G 1/04 340/933 |
| 6,304,321 B1 | 10/2001 | Wangler et al. | |
| 7,224,382 B2 | 5/2007 | Baker | |
| 7,660,458 B1* | 2/2010 | Saric | H04N 1/047 382/154 |
| 8,497,783 B2 | 7/2013 | Leopold et al. | |
| 2007/0003146 A1* | 1/2007 | Ko | G08B 13/19641 382/224 |
| 2011/0103647 A1* | 5/2011 | Leopold | G08G 1/015 382/103 |
| 2014/0098194 A1* | 4/2014 | Goma | H04N 5/23212 348/47 |
| 2014/0159925 A1* | 6/2014 | Mimeault | G01S 17/58 340/935 |
| 2014/0247354 A1* | 9/2014 | Knudsen | B60R 1/00 348/148 |
| 2015/0175073 A1* | 6/2015 | Graef | G06T 5/005 348/47 |
| 2015/0178911 A1* | 6/2015 | Choi | G06T 7/593 382/104 |
| 2016/0086033 A1* | 3/2016 | Molin | G06K 9/00671 345/419 |
| 2016/0086040 A1* | 3/2016 | Kuehnle | G06K 9/00805 382/103 |
| 2017/0316573 A1* | 11/2017 | Vicenzotti | G06T 7/70 |

FOREIGN PATENT DOCUMENTS

| | | | | |
|---|---|---|---|---|
| EP | 1361488 A1 | 11/2003 | | |
| EP | 2858057 A1 | 4/2015 | | |
| JP | 2012-103919 A | 5/2012 | | |
| KR | 20120104711 A | * | 9/2012 | ....... G08B 13/19652 |
| RU | 2523167 C2 | 7/2014 | | |
| WO | 2014/076300 A1 | 5/2014 | | |
| WO | 2016/083553 A1 | 6/2016 | | |

OTHER PUBLICATIONS

Australian Examination Report received for Application No. 2015352462, dated Jun. 5, 2017, 2 pages.
International Preliminary Report on Patentability received for PCT Patent Application No. PCT/EP2015/077862, dated Sep. 21, 2016, 7 pages.
Office Action Received for Chilean patent application No. 201701337, presented on Sep. 25, 2018,10 pages (Official copy only).
Office Action Received for Chilean patent application No. 201701337, presented on Mar. 26, 2019,10 pages(Official copy only).
Extended European Search Report received for EP Application No. 14195255.6, dated Feb. 4, 2015, 7 pages.
Search Report received for Russian Patent Application No. 2017122336, completed on Jun. 14, 2019, 4 pages (2 pages of Official Copy and 2 pages of English Translation).

* cited by examiner

METHOD OF CONTROLLING A TRAFFIC SURVEILLANCE SYSTEM

CROSS-REFERENCE TO RELATED APPLICATION(S)

This application is a U.S. national phase of International Application No. PCT/EP2015/077862 filed Nov. 27, 2015, which designates the U.S. and claims priority to European Patent Application No. 14195255.6 filed Nov. 27, 2014, the disclosures of which are herein incorporated by reference in their entireties.

BACKGROUND

Technical Field

The present disclosure relates to a method of controlling a traffic surveillance system. In particular, the present disclosure relates to a method of determining a characteristic of a moving object such as the number of axles of a vehicle. In addition, the present disclosure relates to a processing unit for a traffic surveillance system configured for implementing a method of controlling the traffic surveillance. One example embodiment of the method may be used and/or installed in e.g. a road tolling system.

Background Art

Traffic surveillance systems are typically configured to detect, monitor/track and register moving objects such as vehicles passing in a surveillance zone. Typically, the surveillance zone is defined by a predetermined extension of one or several traffic lanes along a road section. The traffic surveillance system should be arranged and installed so that the system has low or zero impact on the traffic flow, and also low visual impact.

One type of traffic surveillance system may include two cameras arranged as a pair on a gantry and positioned to capture one lane of a surveillance zone. The first of the two cameras is directed towards a first end zone wherein vehicles are entering the surveillance zone and the second of the two cameras is directed towards a second end zone wherein the vehicles are exiting the surveillance zone. As an example, the cameras may be focused at a predetermined height above the road corresponding to the height of a license plate of the passing vehicles. The predetermined height can be set based on the most common height of license plates on a standard vehicle. The images that are captured by the cameras are typically processed in an ANPR (automatic number plate recognition) system.

Hitherto known traffic surveillance systems are typically used to detect speeding vehicles, unsafe driving and accident scenes without the use of a human to actively monitor the traffic to identify this type of scenes. In an automated system, a human operator is only required to verify the traffic violation at a later reviewing stage. In some cases, it is even possible that a fine or a court summoning may be logged and dispatched automatically without verification by the operator. In another related activity, the system may be configured to gather statistics over the road to identify whether changes of the road should be considered and implemented in order to increase the safety of the overall function of the road.

A traffic surveillance system is particularly useful to be installed in a road tolling system so as to detect and register vehicles driving on a road that is subjected to toll fees, sometimes in terms of tax. One commonly used road tolling system comprises a gantry with several devices, a transceiver and a set of sensors. The transceiver may be used for automatic registration of passing vehicles equipped with transponders. Vehicles with transponders are hereby automatically tolled each time they pass a road toll station. Sensors, such as cameras, are used to capture images of the license plates of passing vehicles without transponders. Depending on the configuration of the system, the images can be used to perform tolling based on the license plate number or serve as an evidence of non-compliance in the case transponders are required. Road tolling systems may also be configured to classify vehicles based on physical characteristics such as size or volume of the vehicle.

Despite the activity in the field, there remains an unaddressed need for improving the function and use of the traffic surveillance system. In particular, it would be desirable to increase the possibilities for the users of the system, such as the users of a road tolling system, to make more precise classifications of the vehicles passing through the surveillance system.

BRIEF SUMMARY

To achieve more accurate or reliable surveillance, some traffic systems employ various techniques to improve the accuracy of the system. One such technique is the use of stereoscopic cameras or sensors. A stereoscopic sensor comprises of a first and a second camera spaced apart. Both cameras are directed such that they have a capturing area covering essentially the same area segment, i.e. the stereoscopic sensor monitored area segment. The cameras of the stereoscopic sensor are calibrated such that they have a surveillance plane, which is aligned with the monitored area segment, whereby the surveillance plane indicates a zero plane, and height/depth are measured with the surveillance plane as a zero plane. The stereoscopic sensor uses two cameras to capture images of the monitored area segment. A moving object that is in the surveillance plane, such as a shadow on a road, will have the same position in an image from the first camera and an image from the second camera. A moving object that is located below or above the surveillance plane (such as point of a vehicle upon the road) will have a slightly different position in an image from the first camera than in an image from the second camera of the stereoscopic sensor. This difference is due to the different angles the cameras have in relation to the moving object. By using this technique a height/depth image/map (from now on only referred to as height image) can be created of the monitored area segment.

Stereoscopic sensors and systems with stereoscopic systems are used to monitor traffic, especially in critical situations such as a toll gantry or toll plaza. Stereoscopic sensors and systems therewith can be applied in other applications, such as monitor shopping malls, parking lots, air fields and any other places where a height image of the monitored area is of advantage. The stereoscopic sensors can capture single images or be used to capture film sequences. The information in a height image can be used for classification of objects such as e.g. vehicles, airplanes, persons and tires depending on application.

It is an object of example embodiments of the disclosure to provide a method of controlling a traffic surveillance system which allows for a simple, yet reliable and precise, determination of a characteristic relating to a vehicle. This and other objects, which will become apparent in the following, are accomplished by a method of controlling a traffic surveillance system as defined in the accompanying independent claim. Details of some example embodiments and optional features are recited in the associated dependent claims.

According to a first aspect, there is provided a method of controlling a traffic surveillance system. The system comprises a plurality of stereoscopic sensors connected to a processing unit. Each stereoscopic sensor of the plurality of the stereoscopic sensors is configured for capturing a first image and a second image capable of being processed into a height image by the processing unit. In addition, each stereoscopic sensor of the plurality of the stereoscopic sensors is configured to define and monitor a main surveillance zone defining a primary coverage in a surveillance plane at a predetermined distance from the stereoscopic sensor. As such, any one of the captured first image, the captured second image and the processed height image includes a primary view corresponding to the primary coverage of the stereoscopic sensor. The method comprises the steps of:

capturing first images and second images over time by the plurality of the stereoscopic sensors;

processing a first image and a second image from a first stereoscopic sensor of the plurality of the stereoscopic sensors to produce a first height image therefrom by means of the processing unit;

analysing said first height image to detect a moving object such as vehicle located within the primary view of the first stereoscopic sensor; and analysing a part of a primary view of at least any one of a first image, a second image and a combination of the first and second images captured by a second stereoscopic sensor based on the detected moving object in said first height image to determine a characteristic of the moving object.

Hereby, the stereoscopic sensors of the surveillance system used in the method are controlled to interact with each other in order to detect a moving object such as a vehicle by one sensor and, based on data relating to this operation, i.e. the detected vehicle, to identify the most optimal image among the captured images of the other sensors of the system so as to determine a characteristic of the vehicle in a reliable and precise manner, as is further described hereinafter.

As mentioned herein, the moving object generally refers to a vehicle, such as a truck, bus or the like.

The function and example embodiments of the present patent application are expediently depicted by means of a non-limiting example when the method is used for determining a number of axles of a vehicle. Determining the number of axles of a vehicle in a more precise manner is relevant for many road toll operators, having a wish for tolling with classification from the number of axles of the vehicle. Today, this is normally achieved by a separate axle count system which could be expensive, inaccurate and difficult to integrate with the other parts and/or operations of the tolling system. In addition, an installation of a separate axle count system may often require significant road invasive installations which could be difficult to repair. However, the configuration of the example embodiment of the method as mentioned above uses a stereoscopic sensors system to initially process a first image and a second image from a first stereoscopic sensor to produce a first height image, and thereafter perform an analysis of the height image to detect the vehicle located within the primary view. When the vehicle has been detected and/or identified by the first stereoscopic sensor, the system is capable of determining the precise location of the vehicle in the surveillance zone (typically corresponding to the monitored road section), via the height image analysis. Thereafter, based on data relating to the detected vehicle in the first height image, the method continues to initiate an analysis of a part of a primary view of a first image, a second image and/or a combination of the first and second images captured by a second stereoscopic sensor to determine the number of axles of the vehicle. In this manner, the method is capable of performing an analysis of the characteristics of the vehicle, e.g. the number of axles, from an image that has captured the most optimal view of the vehicle axles, i.e. the most optimal view of a region of interest of the vehicle characteristic so as to achieve more accurate measurements of the characteristic. The axle detection can be performed once per vehicle when the whole vehicle is visible at the same time in the optimal position. Alternatively, the axle detection can be performed continuously during the whole passage covered by the surveillance zone of the sensors. In this manner, the method is configured to provide weighted average detections of axles. In addition, this type of configuration may permit that axles on long trucks and trailers can be detected part by part.

Accordingly, by the configuration of the method as mentioned above, it becomes possible to provide a method of controlling a traffic surveillance system for determining a characteristic of a vehicle in a more reliable and less expensive manner compared to hitherto known methods.

In one example embodiment, the method is particularly useful for determining a number of axles of a vehicle.

Thus, the present disclosure also relates to a method of determining a characteristic of a moving object such as the number of axles of a vehicle.

Typically, although not strictly required, the method may be configured to initiate an analysis of a part of the primary view of at least a first image, a second image and/or a combination of the first and second images captured by another stereoscopic sensor before said images are transformed into a height image. In this manner, it becomes possible to more accurately acquire information about a certain characteristic of the vehicle, as further described hereinafter. It should, however, be readily appreciated that the first image, the second image and/or the combination of the first and second images may be saved by the system for an analysis later on.

As will be further described in relation to the example embodiments herein, there are several different possibilities to perform an analysis of the first image and/or the second image.

By the provision that the method includes the step of capturing images by means of a plurality of stereoscopic sensors, the method is configured to take advantage of the wider view of a stereoscopic sensor in the sense that the detected vehicle driving on e.g. a road is covered both by a primary coverage of a first stereoscopic sensor and a secondary coverage, typically an outer area (sometimes denoted as the side view) of a second stereoscopic sensor. In other words, in the case of a road section, the system is arranged to define and monitor a surveillance zone such that the stereoscopic sensor is capable of monitoring a predetermined road section in the surveillance zone via the primary coverage (or primary view) and an area of an adjacent road section in the surveillance zone via the side coverage of the primary coverage (side view of the primary view). Thus, due to the characteristic of the stereoscopic sensor, each stereoscopic sensor can be configured by the method to monitor a predetermined road section and an area of an adjacent road section.

Besides that the characteristic may refer to the number of axles of the vehicle, the characteristic may refer to any one of the following; a presence of windows, a ground clearance, an angle of the front window and an indication of objects attached on top of or behind the vehicle (e.g. bicycles).

By the provision of analysing the first height image to detect a moving object such as vehicle located within the primary view, it becomes possible to determine the precise location of the vehicle in the surveillance plane, typically corresponding to the predetermined road section.

As an example, the step of analysing the first height image to detect a moving object such as vehicle located within the primary view includes the step of determining the position of the vehicle by coordinates in a three-dimensional Cartesian coordinate system. As an example, a vehicle is detected by analysing a height image for clusters of height pixels. Typically, a tracking box is determined around the cluster which will follow the height pixels as they move. From this tracking box, it becomes possible to derive the vehicle's position, speed, length, height and width, to be used in calculating which other sensor that provides the best side view of the vehicle.

According to one example embodiment, the method is configured for detecting the number of axles of a vehicle. Thus, the method comprises the step of analysing a part of a primary view of a first image, a second image and/or a combination of the first and second images captured by the second stereoscopic sensor based on the detected moving object in said first height image to determine a number of axles of the moving object.

According to one example embodiment, the method may further comprise the step of processing a first image and a second image from at least the second stereoscopic sensor to produce a second height image therefrom by means of the processing unit.

Typically, the primary coverage in the surveillance plane of at least the first stereoscopic sensor overlaps the primary coverage in the surveillance plane of the second stereoscopic sensor.

In general, a surveillance zone may be defined as the coverage of the traffic surveillance system in a plane from which a carrying structure, such as a gantry, protrudes. In other words, the surveillance zone herein refers to the area upon the surveillance plane, which the traffic surveillance system covers, i.e. the captured area of the plurality of the stereoscopic sensors of the traffic surveillance system.

In an implementation of the traffic surveillance system, the surveillance area is adapted to correspond to the traffic area in which monitoring and/or registering of vehicles is desired. Thus, a surveillance zone may typically include a road surface, a predetermined road section and/or adjacent road sections or the like. It should be readily understood that in an implementation of the traffic surveillance system, the surveillance plane is arranged in parallel with a plane of the road surface, the predetermined road section and/or the adjacent road section etc. to be monitored. A predetermined road section may typically overlap with an adjacent road section, or at least being arranged boundary-to-boundary to each other such that a vehicle passing several road sections, over the boundaries, may be continuously monitored by the system.

In an example when the system and method are used to monitor traffic driving on one or several traffic lanes, the surveillance zone of one stereoscopic sensor may typically cover a predetermined road section including a first traffic lane and a second traffic lane.

As mentioned above, there are several different possibilities to perform an analysis of the first image and/or second image captured by the second stereoscopic sensor.

According to one example embodiment, the step of determining the characteristic of the moving object is based on pattern matching with one or several statistical models of the moving object. Hence, the step of analysing a part of the primary view of the first image, second image and/or the combination of the first and second images captured by the second stereoscopic sensor comprises the step of determining the characteristic of the moving object by means of pattern matching with one or several statistical models of the moving object. Typically, the one or several statistical models of the moving object may be stored in a memory in the system, e.g. in the processing unit.

With the use of a statistical model including, as an example, the dimensions of the vehicle and other features, the area for analysis is kept smaller. Thus, the analysis process could be kept shorter, typically resulting in more reliable results.

Typically, the statistical model(s) is based on standard height levels, standard length levels, standard width levels, cabin size, fingerprinting information, license plate information, weather condition information and the like.

According to one example embodiment, the characteristic of the moving object is determined by determining several height disparity values of the moving object where clusters of disparity values lower than a first threshold indicates the presence of an axle. In one example embodiment, the indication of the axle may be detected by indicating the presence of the wheel.

In other words, the method includes the step of determining several height disparity values of the moving object where clusters of disparity values lower than a first threshold indicates the presence of an axle.

In addition, if the cluster includes values lower than a second threshold, the method is configured to indicate that the wheel of the moving object is in contact with the ground.

Typically, the several height disparity values of the moving object are determined from the first image, second image and/or combination of the first and second images captured by the second stereoscopic sensor prior to producing a second height image thereof. The disparity values are calculated from differences in positions of contrasts in the first and second image. The disparity value is equal to the height value, but it has not yet been moved to the correct position in the height position, e.g. a pole seen slightly from the side will have several disparity values, but in the height image the disparity values they will all be transformed to one position with only the greatest disparity/height value visible. This means that e.g. the side of a trailer will have many disparity values including the disparity values for the wheels, while in the height image they will all be covered by the height from the roof.

According to one example embodiment, the provision to determine a characteristic of the moving object may refer to determining a position of a tire of the vehicle corresponding to the vehicle axle of the vehicle as seen in a three-dimensional Cartesian coordinate system.

In one configuration of the method, the system and the method may be arranged to monitor a traffic lane and at least one adjacent traffic lane. In other words, each stereoscopic sensor of the plurality of stereoscopic sensors is arranged to monitor a traffic lane and a part of an adjacent lane. To this end, the system is configured to monitor a plurality of traffic lanes.

Typically, at least a part of the primary coverage of each stereoscopic sensor of the plurality of stereoscopic sensors is directed towards a predictable vehicle axle region of the vehicle.

According to one example embodiment, the method further comprises the step of pre-determining whether a vehicle exceeds a predetermined activation value such as minimum height value, a minimum length value or a minimum number of vehicle axles.

According to one example embodiment, the step of analysing of a part of a primary view of a first image, a second image and/or a combination of the first and second images captured by a second stereoscopic sensor (based on the detected moving object in the first height image to determine a characteristic of the moving object) is activated when a vehicle exceeds the predetermined activation value.

Typically, although not strictly required, the plurality of stereoscopic sensors are mounted upon a gantry and configured to define the surveillance plane upon a road surface below the gantry.

It is to be noted that the term "a combination of the first and second images" may refer to a disparity image. As is well-known in the field of stereo images, disparity refers to the distance between two corresponding points in a left image and a right image of a stereo pair. Thus, as mentioned above, disparity values are calculated from differences in positions of contrasts in the first (left) and second (right) image. The disparity value is equal to the height value, but it has not yet been moved to the correct position in the height position.

It is to be noted that the primary coverage may further be defined by having a secondary coverage, typically corresponding to the outer region of the primary coverage. In this manner, any one of the captured first image, the captured second image and the processed height image includes a secondary view corresponding to the secondary coverage.

As such, the surveillance zone may be defined such that the first camera and the second camera essentially monitors a predetermined road section in the surveillance zone via the primary coverage and an area of an adjacent road section in the surveillance zone via the secondary coverage. In this manner, each stereoscopic sensor is configured to monitor a predetermined road section and an area of an adjacent road section.

In a traffic situation when the relevant vehicle is obscured by another vehicle so that the characteristic of the vehicle is invisible in the image captured by a stereoscopic sensor (e.g. the second sensor), the method is capable of finding the most optimal captured image to analyse due to that the first stereoscopic sensor is capable to determine the exact position of the vehicle as seen in a three-dimensional Cartesian coordinate system. As such, the method may, via the step of producing a first height image from the images of the first stereoscopic sensor and the step of analysing the first height image to detect the vehicle located within the primary view, identify whether the vehicle is obscured by another vehicle or object, and determine if the obscuring vehicle prevent the characteristic of the vehicle to be accurately determined so as to evaluate and decide which one of the available images that should be analysed based on the detected vehicle in the first height image from the first sensor.

Typically, the processing unit may refer to a processing circuitry, a control unit or the like, and/or may include a microprocessor, microcontroller, programmable digital signal processor or another programmable device. The processing unit may also, or instead, include an application specific integrated circuit, a programmable gate array or programmable array logic, a programmable logic device, or a digital signal processor. Where the processing unit includes a programmable device such as the microprocessor, microcontroller or programmable digital signal processor mentioned above, the processor may further include computer executable code that controls operation of the programmable device.

Typically, the processing unit is configured to receive first images and second images from the plurality of the stereoscopic sensors and further configured to process said images into a height image.

In general, the processing unit is configured to control the system as mentioned above, i.e. to perform the method steps of the method as mentioned above.

Typically, although not strictly required, the processing unit may also be configured to perform a pattern matching with one or several statistical models of the moving object so as to determine the characteristic of the moving object (vehicle).

It is to be noted that each stereoscopic sensor of the plurality of stereoscopic sensors sometimes may refer to or be denoted as a stereoscopic camera.

In addition, each stereoscopic sensor may generally comprise a first camera adapted to capture a first image and a second camera adapted to capture a second image.

As such, the first stereoscopic sensor is provided with a first camera adapted to capture a first image and a second camera adapted to capture a second image. In addition, the first stereoscopic sensor is configured to be directed at a road such that both the first camera and the second camera essentially monitors a first predetermined road section via the primary coverage so that the first sensor monitors the first predetermined road section.

Analogously, the second stereoscopic sensor is provided with a first camera adapted to capture a first image and a second camera adapted to capture a second image. In addition, the second stereoscopic sensor is configured to be directed at a road such that both the first camera and the second camera essentially monitors a second predetermined road section via the primary coverage so that the second sensor monitors the second predetermined road section.

According to a second aspect, the object is achieved by a processing unit. According to the second aspect, there is provided a processing unit for a traffic surveillance system, which is configured for implementing a method according to the first aspect and/or any one of the example embodiments as mentioned above. Further effects of this second aspect are largely analogous to those described above in relation to the first aspect.

The term "height image" generally refers to an image in which each pixel has an associated height value. The height image is e.g. an image disclosing heights above the road of the road section covered by the stereoscopic camera. In this type of application, the height value is zero for the ground level, i.e. the road level. However, in some cases, the height value is set to zero also for uncertain values relating to obscure pixels. Thus, in some examples, the process of identifying heights in the height image may include the step of associating obscure pixels with a height value of zero.

The height image is created by combining the information from the first image, captured by the first camera of the stereoscopic camera, and the second image, captured by the second camera of the stereoscopic camera.

In other words, in the context of the present patent application, a "height image" is an image comprising information from the first and the second images, and in which each pixel in the height image has an associated height value. A height attribute specifies the height of an image, in pixels.

In addition, a height image from one stereoscopic camera may be aligned, or combined, with a height image from another stereoscopic camera to form a combined height image, as the coordinates of a height image are aligned and thus typically synchronized with each other. Thus, one height image from one stereoscopic camera and another height image from another stereoscopic camera may form a combined height image.

Typically, although not strictly necessary, height calculations are conducted from information in the combined height image.

The process of calculating the heights from the first and the second image is a commonly known method, and is thus not further described herein.

Further features of, and advantages with, example embodiments of the present patent application will become apparent when studying the appended claims and the following description. The skilled person realizes that different features of the present patent application may be combined to create embodiments other than those described in the following, without departing from the scope of the present patent application.

BRIEF DESCRIPTION OF THE DRAWINGS/FIGURES

The various example embodiments, including its particular features and example advantages, will be readily understood from the following illustrative and non-limiting detailed description and the accompanying drawings, in which:

FIG. 1a schematically illustrates a traffic surveillance system operable by a method according to an example embodiment;

FIG. 1b is a schematic top view of the system in FIG. 1a;

FIG. 1c schematically illustrates an exemplary embodiment of a stereoscopic camera pair of a stereoscopic sensor;

FIG. 2 schematically illustrates the traffic surveillance system in FIG. 1a, in which further details of the system are illustrated;

FIG. 3 illustrates an image from a stereoscopic sensor according to an example embodiment;

FIG. 4 schematically illustrates a traffic surveillance system operable by a method according to an example embodiment, in which the system is provided with a plurality of stereoscopic sensors;

DETAILED DESCRIPTION

Figure 1A:
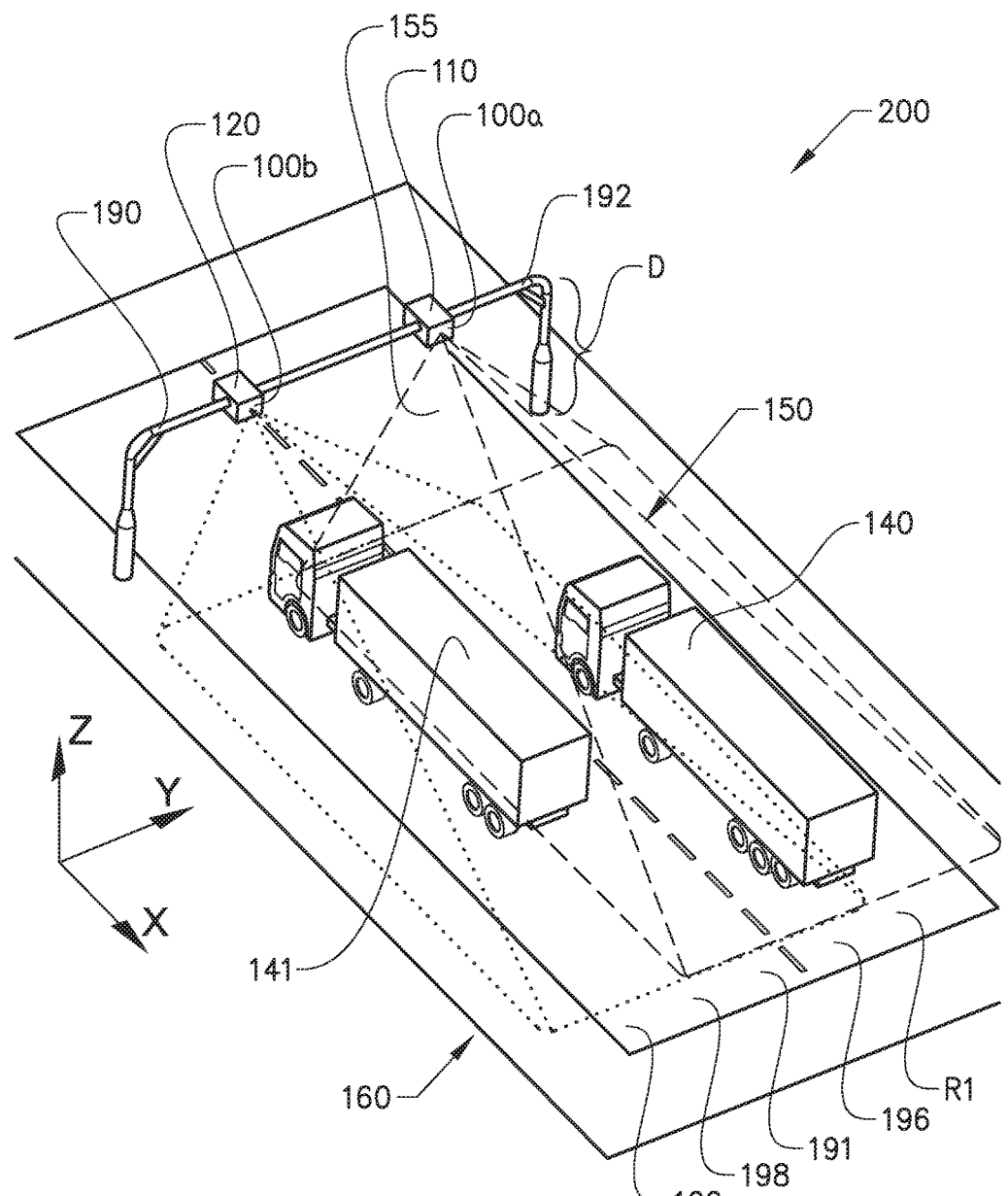

Example embodiments of the present patent application will now be described more fully hereinafter with reference to the accompanying drawings. The present patent application may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present patent application.

Figure 1B:
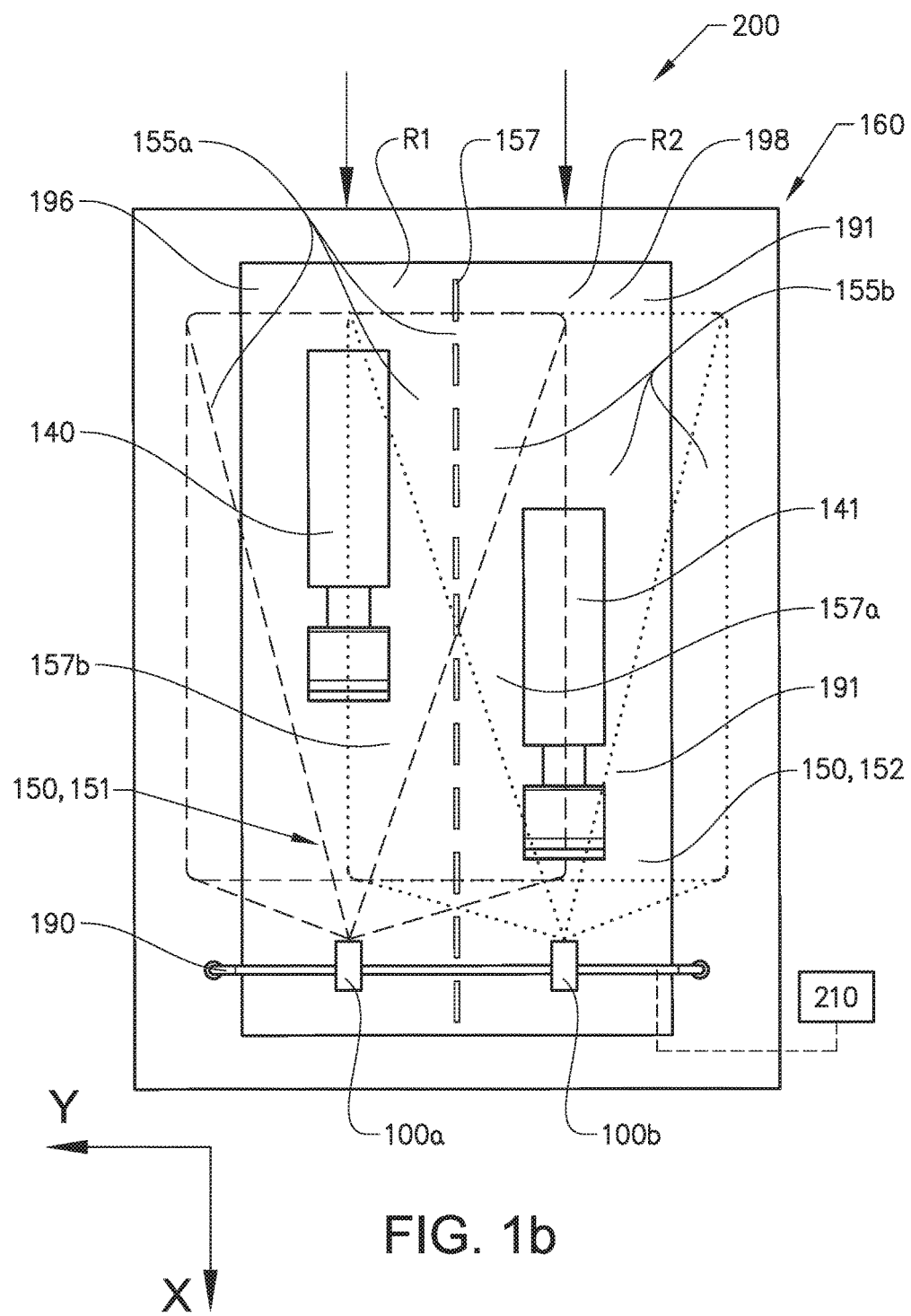
Figure 1C:
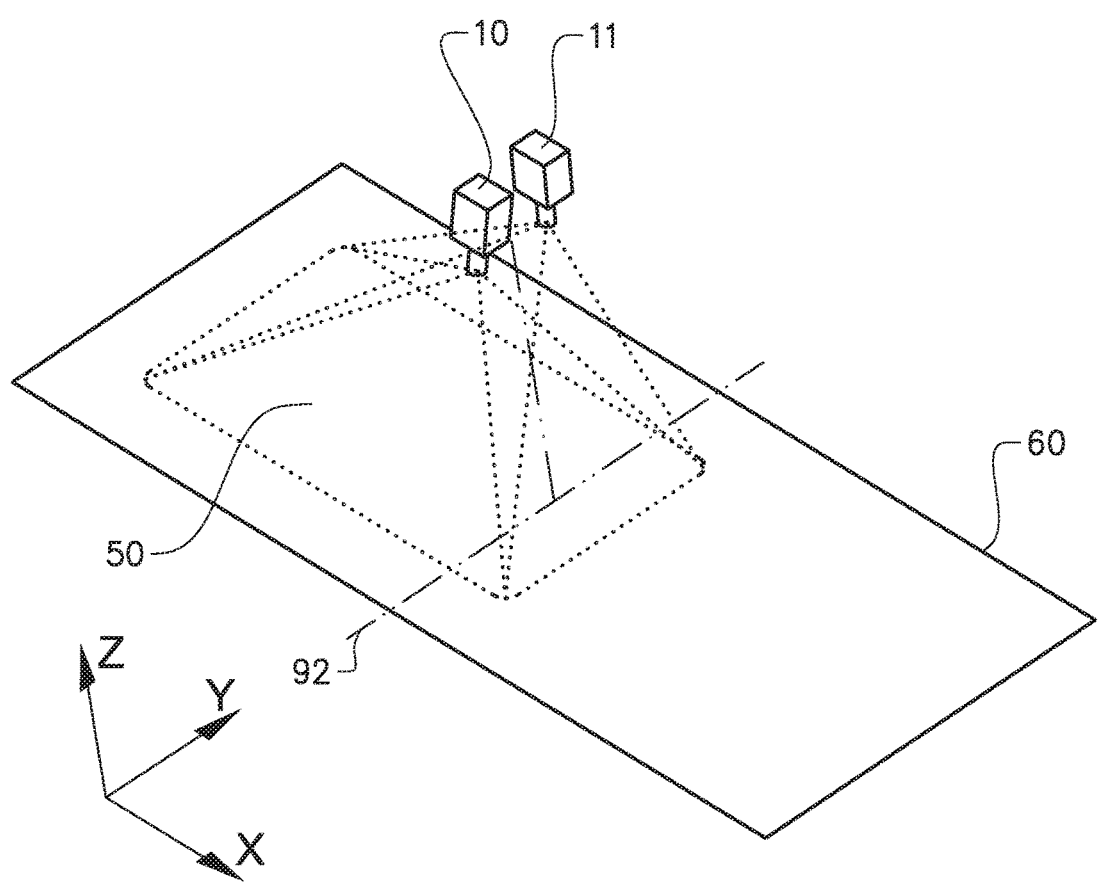

Referring now to the figures and FIG. 1c in particular, there is depicted an exemplary embodiment of a stereoscopic camera pair 10, 11, which stereoscopic sensor camera pair 10, 11 is adapted to define a surveillance zone 50 in a surveillance plane 60. The stereoscopic camera pair 10, 11 comprises a first and a second camera 10, 11, which are adapted to capture images of the surveillance plane 60. The surveillance plane 60 extends in an X- and a Y-direction and the stereoscopic camera pair 10, 11 is provided with a distance to the surveillance plane 60 in the Z-direction in the figure, whereby the X- Y- and Z-directions are orthogonal to each other. The stereoscopic camera pair 10, 11 has a projected mounting position 92 in the surveillance plan 60. The arrangement of the stereoscopic camera pair 10, 11 in FIG. 1c can be considered as a standard set up of a stereoscopic camera pair 10, 11.

The cameras 10, 11 are calibrated such that they define the surveillance plane 60, whereby the surveillance plane 60 indicates a zero plane, and height/depth are measured with the surveillance plane 60 as a zero plane. The first camera and the second camera 10, 11 capture their images simultaneously. Any object that is in the surveillance plane 60, such as a shadow on a road, will have the same position in an image from the first camera 10 and an image from the second camera 11. Any object or part of an object that is located below or above the surveillance plane 60 (such as part of a vehicle upon the road) will have a slightly different position in an image from the first camera 10 than in an image from the second camera 11 of the stereoscopic sensor. This difference is due to the different angles the cameras 10, 11 have in relation to the surveillance plane 60 and to the object.

Turning now to the other figures and FIG. 1a in particular, there is depicted a traffic surveillance system comprising a plurality of stereoscopic sensors connected to a processing unit, which can be controlled by a method according to an example embodiment. For the sake of simplicity, the traffic surveillance system may sometimes be denoted as the surveillance system or simply as the system. The locations of the components in the system and the locations of other features, components or sections used to describe the implementations of the present patent application may herein be explained and illustrated in relation to a longitudinal direction X, a transverse direction Y and a vertical direction Z.

The system 200 in this example embodiment is arranged to monitor a surveillance zone 150 in the form of a road surface 191. As illustrated, the system is here arranged to monitor a traffic lane 196 and at least one adjacent traffic lane 198.

On the road surface, sometimes also denoted as a road section, there is typically one or several moving objects such as one or several vehicles 140, 141. The system is particularly applicable for monitoring heavy road vehicles such as heavy trucks or buses. However, it will be readily appreciated that other moving objects and/or vehicles may be monitored. In other words, the traffic surveillance system 200 is configured to monitor, track and register vehicles passing through a main surveillance zone 150.

As mentioned above, the system 200 comprises a plurality of stereoscopic sensors 100a, 100b connected to a processing unit 210, as shown in FIG. 1b. Each stereoscopic sensor 100a-100n of the plurality of the stereoscopic sensors is configured for capturing a first image and a second image capable of being processed into a height image by the processing unit. In addition, each stereoscopic sensor of the plurality of the stereoscopic sensors is configured to define and monitor a main surveillance zone 150 defining a primary coverage 155 in a surveillance plane 160 at a predetermined distance D from the stereoscopic sensors 100a or 100b. As such, any one of the captured first image, the captured second image and the processed height image includes a primary view corresponding to the primary coverage of the stereoscopic sensor.

The surveillance plane 160 here corresponds to the surveillance plane 60 disclosed in FIG. 1c. Each stereoscopic sensor 100a, 100b comprises a camera pair 110. Each camera pair 110 here corresponds to the camera pair 10, 11 disclosed in FIG. 1c. Each camera pair 110 defines a main surveillance zone (e.g. 151, 152) in the surveillance plane 160.

The surveillance plane 160 extends in the plane defined by the longitudinal direction X and the transverse direction Y. Moreover, each stereoscopic sensor is typically located at the predetermined distance D above the surveillance plane 160, as seen in the vertical direction Z.

Hereby, the surveillance plane 160 acts as the reference plane when combining images captured by a camera pair of the stereoscopic sensor to produce height images. As an example, a point determined to be in the surveillance plane 160 has a height of 0, a point above the plane has a positive height equal to the difference in height between the point and the plane 160, and a negative height if below the plane 160. When a stereoscopic sensor 100 is arranged to monitor a section of road, the surveillance plane 160 is arranged along the road surface 191, whereby the height above the surveillance plane 160 is equal to the height above the road surface 191.

Typically, the stereoscopic sensor is a stereoscopic camera, as is known in the art. Thus, in the example embodiment described in relation to FIGS. 1a and 1b, and in all other example embodiments, each stereoscopic sensor generally comprises a first camera adapted to capture a first image and a second camera adapted to capture a second image. In other words, each stereoscopic sensor generally comprises a camera pair for capturing a first image and a second image, which can be processed into a height image. To this end, the first surveillance sensor 100a has a first camera pair 110 for capturing a first image and a second image, which can be processed into a first height image. Thereby, the first camera pair 110 is adapted to be directed to cover essentially the same area of the surveillance zone, such that the first height image becomes a "zero-plane" a predetermined distance from the first stereoscopic sensor 100a.

Analogously, the second surveillance sensor 100b has a second camera pair 120 for capturing a first image and a second image, which can be processed into a second height image. Thereby, the second camera pair 120 is adapted to be directed to cover essentially the same area of a surveillance zone, such that the second height image becomes a "zero-plane" a predetermined distance from the first stereoscopic sensor 100b.

In other words, when the surveillance zone is a predetermined road section, the first camera and the second camera in a stereoscopic sensor are essentially directed at the same predetermined road section such that two separate images are produced, taken at the same time. Thus, a height image of the predetermined road section can be produced by performing image processing on the first image and the second image, which is typically carried out by a processing unit as is further described hereinafter. In general, the plane of the road is arranged at essentially the same position in the first image and the second image. Although not shown, the stereoscopic sensor e.g. 100a or 100b is typically arranged in an angled configuration to capture the predetermined road section, with the view of the sensor extending from the horizon to the vicinity of the sensor. By this configuration of the sensor, it becomes possible to use the stereoscopic sensor for traffic behaviour surveillance on a long stretch of the road, enabling analysis of complex traffic situations that may take place over longer distances or for an extended time.

The stereoscopic sensor may also be directed at the road so that the predetermined road section stretches from one part of the horizon to another part of the horizon, e.g. by using a wide angle lens.

The surveillance zone 150 is provided in the plane 160 above the plurality of the stereoscopic sensors, and typically from which a gantry 190 protrudes, as shown in FIG. 1a or 1b. Accordingly, the surveillance zone 150 is arranged in ground level corresponding to the plane of the road surface 191 being under surveillance by the system 200. The surveillance zone may thereby be defined as the coverage of the traffic surveillance system in a plane from which a carrying structure, such as a gantry, protrudes. In other words, the surveillance zone herein refers to the area upon the surveillance plane, which the traffic surveillance system covers, i.e. the capture area of the plurality of the stereoscopic sensors of the traffic surveillance system. Thus, a surveillance zone may typically include a road surface, a predetermined road section and/or adjacent road sections or the like.

It should be readily understood that in an implementation of the traffic surveillance system, the surveillance plane is arranged in parallel with a plane of the road surface, the predetermined road section and/or the adjacent road section etc. to be monitored. A predetermined road section may typically overlap with an adjacent road section, or at least being arranged boundary-to-boundary to each other such that a vehicle passing several road sections, over the boundaries, may be continuously monitored by the system.

As illustrated in the Figures, with particular reference to FIGS. 1a and 1b, the surveillance zone 150 is drawn upon (defined on) a predetermined road section $R_1$ such as a plurality of traffic lanes 196, 198. As such, a main surveillance zone may correspond to a first traffic lane and a part of an adjacent traffic plane. To this end, the system is here arranged to monitor a traffic lane 196 and at least one adjacent traffic lane 198, although the system may typically monitor several traffic lanes. More specifically, each stereoscopic sensor of the plurality of stereoscopic sensors 100a, 100b etc. is arranged to monitor a traffic lane and a part of an adjacent lane.

In other words, in an example when the surveillance zone is drawn upon (defined on) a predetermined road section, each stereoscopic sensor of the plurality of the stereoscopic sensors 100a, 100b etc. is configured to define and monitor a main surveillance zone 150 defining a primary coverage 155 of a predetermined road section R at a predetermined distance from the stereoscopic sensor 100a or 100b.

Moreover, at least a part of the primary coverage of each stereoscopic sensor of the plurality of stereoscopic sensors is typically directed towards a predictable vehicle axle region of the vehicle.

As mentioned above, the first stereoscopic sensor 100a is provided with the first camera adapted to capture a first image and the second camera adapted to capture a second image. In addition, as shown in FIG. 1b, the first stereoscopic sensor 100a is here configured to be directed at a road such that both the first camera and the second camera essentially monitors the first predetermined road section $R_1$ via the primary coverage 155a so that the first stereoscopic sensor monitors the first predetermined road section $R_1$.

Analogously, the second stereoscopic sensor 100b is provided with a first camera adapted to capture a first image and a second camera adapted to capture a second image. In addition, the second stereoscopic sensor 100b is configured to be directed at a road such that both the first camera and the second camera essentially monitors a second predetermined road section $R_2$ via the primary coverage 155b so that the second stereoscopic sensor monitors the second predetermined road section $R_2$.

As such, the first stereoscopic sensor 100a is here configured to define and monitor a first main surveillance zone 151 defining a primary coverage 155a in the surveillance plane 160 at a predetermined distance from the stereoscopic sensor 100a. That is, the first main surveillance zone 151 here corresponds to the first predetermined road section $R_1$. Analogously, the second stereoscopic sensor 100b is here configured to define and monitor a second main surveillance zone 152 defining a primary coverage 155b in the surveillance plane 160 at a predetermined distance from the stereoscopic sensor 100b, as seen in the vertical direction Z. That is, the second main surveillance zone 152 here corresponds to the second predetermined road section $R_2$.

Accordingly, a total main surveillance zone is formed by the first main surveillance zone 151 and second main surveillance zone 152. In this context, it is to be noted that there is typically an overlap between the first main surveillance zone 151 and second main surveillance zone 152 as shown in FIGS. 1a and 1b.

As an example, the overlap between the primary coverage of the first sensor and the primary coverage of the second sensor may range between 10-30%. In other words, the overlap may comprise about 10-30% of the primary coverage.

Figure 2:
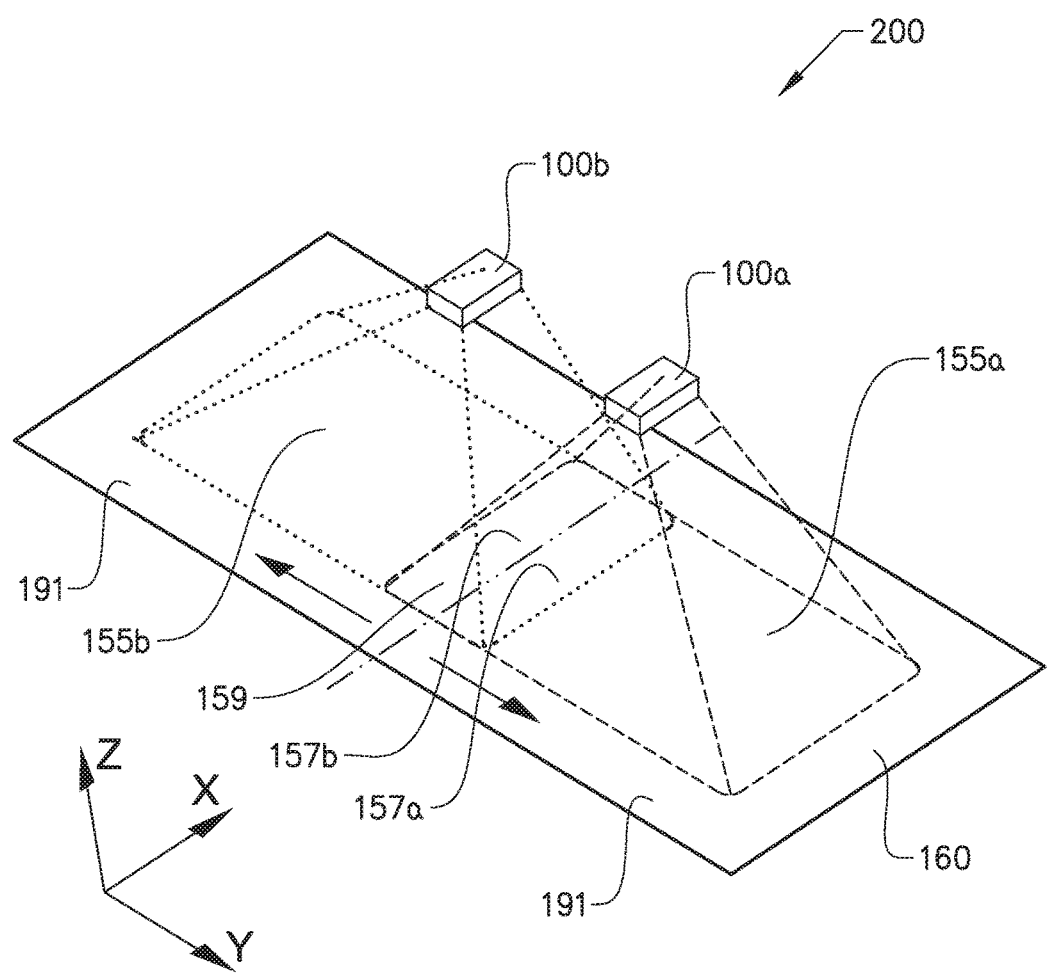

Thus, as further illustrated in FIG. 2, the primary coverage 155a in the surveillance plane of at least the first stereoscopic sensor 100a here overlaps the primary coverage 155b in the surveillance plane of the second stereoscopic sensor 100b. FIG. 2 schematically illustrates further details and definitions of the example embodiment as described in relation to FIGS. 1a and 1b. In FIG. 2 a road section or a road surface 191 including two traffic lanes 196, 198 is illustrated. The road section or road surface 191 is covered both by the primary coverage 155a of the first stereoscopic sensor 100a and the primary coverage 155b of the second stereoscopic sensor 100b.

For ease of understanding and for convenience, the primary coverage may further be defined by having a secondary coverage, typically corresponding to the outer region of the primary coverage. In this manner, any one of the captured first image, the captured second image and the processed height image includes a secondary view corresponding to the secondary coverage.

As such, the surveillance zone may be defined such that the camera pair, i.e. the first camera and the second camera of the stereoscopic sensor, essentially monitors a predetermined road section in the surveillance zone via the primary coverage and an area of an adjacent road section in the surveillance zone via the secondary coverage. In this manner, each stereoscopic sensor is configured to monitor a predetermined road section and an area of an adjacent road section.

To this end, as shown in FIG. 2, a secondary coverage 157a of the first stereoscopic sensor 100a, which is part of the primary coverage 155a, is directed at and thereby monitors essentially the same area in the surveillance plane 160 as a secondary coverage 157b of the second stereoscopic sensor 100b, which is a part of the primary coverage 155b of the second stereoscopic sensor 100b. As such, the system allows for an overlap 159 (dashed area) between the primary coverages of the stereoscopic sensors throughout the surveillance zone (or surveillance plane). It should be readily appreciated that the same configuration as defined between the first stereoscopic sensor and second stereoscopic sensor may likewise be defined between other stereoscopic sensors of the plurality of the stereoscopic sensors. For instance, the primary coverage 155b of the surveillance plane of the second stereoscopic sensor 100b may typically overlap the primary coverage 155c of a surveillance plane of a third stereoscopic sensor 100c and the like, as can be realized from FIG. 4.

In the case of a road section, the system 200 is arranged to define and monitor a surveillance zone such that each stereoscopic sensor is capable of monitoring a predetermined road section in the surveillance zone via the primary coverage and an area of an adjacent road section in the surveillance zone via the secondary coverage of the primary coverage. Thus, due to the characteristic of the stereoscopic sensor, each stereoscopic sensor can be configured by the method to monitor a predetermined road section and an area of an adjacent road section Furthermore, as illustrated in FIG. 1a, each stereoscopic sensor 100a, 100b is typically adapted to be mounted at a mounting position 192 above the surveillance plane, as seen in a vertical direction Z. In general, the mounting position refers to a position of a stereoscopic sensor being directly above the plane, as seen in the vertical direction Z. Each of the camera pairs 110, 120 are typically directed at the surveillance plane 160 at an angle relative said surveillance plane 160. As an example, each stereoscopic sensor may be mounted at about 6.5 meters above the surveillance plane 160. Thus, although not strictly required, the plurality of the stereoscopic sensors are in this example embodiment, and in other example embodiments described herein, mounted upon a gantry 190 and configured to define the surveillance zone 150 upon a road surface 191 below the gantry 190. The gantry may comprise one or several individual structures arranged to make up the gantry while being adapted to carry the at least some of the components of the traffic surveillance system, such as the stereoscopic sensors and the like. Typically, the gantry is provided in the form of a single structure in order to keep the costs to a minimum and reduce the visual impact of the system.

As mentioned above, each stereoscopic sensor of the plurality of the stereoscopic sensors is configured to define and monitor a main surveillance zone 150 defining a primary coverage 155. The direction and the extension of a surveillance zone herein refer to the main direction of the surveillance zone, i.e. along the stretching of the road, road section, road surface and the like.

The operation of the traffic surveillance system 200 may be controlled by the processing unit or the like. Thereby, the processing unit here is configured to control the traffic surveillance system 200 including each stereoscopic sensor of the plurality of stereoscopic sensors 100a-100n. Typically, the processing unit comprises a computer program product. The computer program product includes a computer readable medium having stored thereon computer program means for causing the processing unit to control the operation of the traffic surveillance system. Moreover, the computer program product comprises code for executing a method according to any one of the example embodiments as described hereinafter.

As mentioned above, each stereoscopic sensor is connected to the processing unit, sometimes simply denoted as the processing means. The processing unit is thus configured to receive and process images. In other words, each stereoscopic sensor is typically connected to a processing unit adapted to process images from the stereoscopic sensor. The processing unit can be located essentially in the same structure as the stereoscopic sensor, built into the same housing as the sensors, located in a housing near or on the support structure on which the stereoscopic sensor is mounted, or may be located at a distance or may be connected to the stereoscopic sensor by a network. The processing unit is capable of performing image processing on the images captured by the stereoscopic sensor to allow extraction of data from said images. The processing unit performs image processing on the images captured by the stereoscopic sensor to produce a height image of the road section at which the stereoscopic sensor is being directed. The stereoscopic sensor and the processing unit may typically be connected to a short term memory, in which the first and second images, as well as the height images are stored a predetermined time period, i.e. enough time to be processed.

It should be readily appreciated that all stereoscopic sensors are typically connected to one processing unit. However, the processing unit may include several sub-units, so that each sub-unit is connected to one single stereoscopic sensor. The sub-units can then communicate with a primary processing unit, a central processing unit, or the like.

Using a height image allows identification of objects on the road section, as well as determining the positions of said objects, allowing for better and higher precision traffic surveillance over other traffic surveillance solutions. Another advantage of measuring heights of objects to identify them and distinguish between them is that the problem of shadows being identified as objects is greatly reduced, which allows for more reliable and improved traffic behaviour surveillance.

Accordingly, the processing unit 210 is typically further configured to process images into one height image. As an example, the processing unit can be configured to process images into one height image before transmitting the height image to a central control system 220. The processing unit may further be configured to perform further processing, such as compression, before transmitting the data to the central control system. In this manner, less bandwidth is needed in the communication channels.

Figure 5A:
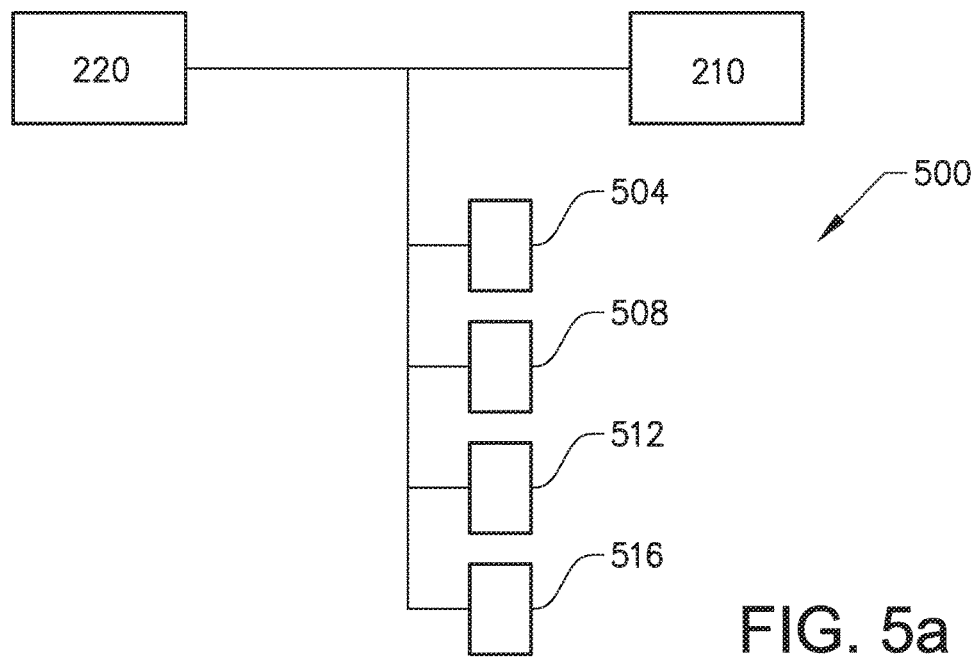
FIG. 5a is a graphic representation of a method for controlling the traffic surveillance system according to an example embodiment.

Turning now to FIG. 5a, there is depicted a graphic representation of a method for controlling the traffic surveillance system, as described above, according to one example embodiment. The method according to example embodiments provides the possibility to control the operation of the traffic surveillance system 200 in an improved manner, while still monitoring the traffic and the main vehicles on the road section.

In particular, by the principle of the method according to the example embodiments, it becomes possible to provide a method of controlling a traffic surveillance system for determining a characteristic of a vehicle in a more reliable and less expensive manner compared to hitherto known methods.

Accordingly, FIG. 5a shows a flowchart of the method 500 of controlling the traffic surveillance system 200 as illustrated in FIGS. 1a through 4. The method comprises the steps of:
 capturing 504 first images and second images over time by the plurality of the stereoscopic sensors;
 processing 508 a first image and a second image from a first stereoscopic sensor 100a of the plurality of the stereoscopic sensors to produce a first height image therefrom by means of the processing unit 210;
 analysing 512 said first height image to detect a moving object such as vehicle located within the primary view; and
 analysing 516 a part of a primary view of at least a first image, a second image and/or a combination of the first and second images captured by a second stereoscopic sensor 100b based on the detected moving object in the first height image to determine a characteristic C of the moving object.

In this example embodiment, the characteristic C refers to the number of axles of a vehicle, in particular a truck. Thus, the method is configured for detecting the number of axles of a vehicle. Thus, the method comprises the step of initiating analyses of a part of a primary view of a first image, a second image and/or a combination of the first and second images captured by the second stereoscopic sensor based on the detected moving object in said first height image to determine a number of axles of the moving object.

The method step 504 may include capturing first images by the first camera and second images by the second camera over time by the cameras of each sensor of the plurality of the stereoscopic sensors. It should be readily appreciated that at this point in the method 500, the system 200 has not yet identified a vehicle, but is searching for images from the camera for a relevant vehicle.

The axle detection can be performed once per vehicle when the whole vehicle is visible at the same time in the optimal position. Alternatively, the axle detection can be performed continuously during the whole passage covered by the surveillance zone of the sensors. In this manner, the method is configured to provide weighted average detections of axles. In addition, this type of configuration may permit that axles on long trucks and trailers can be detected part by part.

Thus, the method steps 512 and 516 can be performed continuously over time. Alternatively, the method steps 512 and 516 may be performed at a given time, only.

In general, the processing unit 210 may be configured to receive images from a first camera of the stereoscopic sensor via a first signal at a first input, and receive images from a second camera of the stereoscopic sensor via a second signal at second input. The first signal and the second signal may be a video signal providing a continuous stream of images. Alternatively, the signals may be provided in the form of periodic snap shots.

By the method step 512 of analysing the first height image (from the first stereoscopic sensor 100a) to detect a moving object such as vehicle 140 located within the primary view, it becomes possible to determine the precise location of the vehicle 140 in the surveillance plane, typically corresponding to the predetermined road section $R_1$ (first main surveillance zone 151). In this example embodiment, the step 512 of analysing the first height image to detect the moving object such as a vehicle located within the primary view may typically include the step of determining the position of the vehicle by coordinates in a three-dimensional Cartesian coordinate system. As an example, the vehicle 140 is detected by analysing a height image for clusters of height pixels. Typically, a tracking box is determined around the cluster which will follow the height pixels as they move. From this tracking box, it becomes possible to derive the vehicle's position, speed, length, height and width, to be used in calculating which other sensor that provides the best side view of the vehicle. In other words, when a vehicle 140 has been detected in the stereoscopic sensor producing the first height image through the method steps 504, 508 and 512, the position of the vehicle is used to calculate which other stereoscopic sensor that has the best side view of the vehicle, e.g. a second stereoscopic sensor 100*b*.

The first and/or second image from that other stereoscopic sensor is then used for an analysis of interesting features (characteristics) as defined in method step 516. In the example embodiment described in relation to FIGS. 1*a*-4, the characteristic C (interesting feature) refers to the number of axles, i.e. the method is set to detect the axles of the vehicle.

The detected position of the vehicle, as obtained in method step 512, in combination with the known position and field of view of the stereoscopic sensor 100*b* is used to calculate the exact area of where in the first and/or second image the analysis should be performed.

As regard the method step 516, there are several different possibilities to determine the characteristic of the vehicle. As an example, the characteristic of the vehicle can be determined by pattern matching with one or several statistical models of the vehicle. Thus, the step of analysing a part of the primary view of the first image, second image and/or the combination of the first and second images captured by the second stereoscopic sensor 100*b* comprises in this example embodiment the step of determining the characteristic C of the moving object (vehicle) by means of pattern matching with one or several statistical models of the moving object (vehicle). Accordingly, the step of determining the characteristic C of the moving object is based on pattern matching with one or several statistical models of the moving object.

With the use of a statistical model including the vehicle's dimensions and other features, the area for analysis could be kept smaller and the analysis process could be kept shorter and with more reliable results. The statistical model will convey where likely axle positions are for a vehicle of such dimensions.

This type of analysis can be made by pattern matching, which is regarded as a well-known technique for analysing images. In other words, according to this example embodiment, the step of determining the characteristic of the moving object with one or several statistical models of the object is here determined based on, or by means of, pattern matching.

A major part of the analysis is thus in this example embodiment pattern matching. In the case with axle detection, template images of wheels are correlated with all positions in the area where the analysis is performed. Positions with a high pattern matching between the templates and the first and/or second image will have a high probability of a wheel and thus an axle. With the use of the statistical model, the area to analyse will be kept small and also the most appropriate templates will be used, depending on e.g. vehicle dimensions, position on the road, time of day, weather condition etc. The templates are typically made up from earlier detections of vehicles in the system.

Although not strictly necessary, the statistical model(s) is typically based on standard height levels, standard length levels, standard width levels, cabin size, fingerprinting information, license plate information, weather condition information and the like. The statistical model(s) of the moving object may be stored in a memory in the system, e.g. in the processing unit 210.

The exact position of the most likely positions of the wheels could be compared with each other to see if a wheel position is slightly higher up than the others. This will be an indication of a probable raised axle i.e. a wheel not in contact with the road. The indication of raised axles can be further aided by the statistical model to convey if the indicated position is a likely position of a raised axle.

In addition, or alternatively to pattern matching analysis, an algorithm looking for low disparity values could be used. As a step in the calculation of a height image, disparity values are calculated. All pixels in a first image that has a contrast over a certain threshold and not having the same information in the corresponding pixel position in the second image will be located along a displacement axis. If a pixel is successfully found in the second image, the displacement will be transformed to a disparity value indicating the height of that pixel. For a vehicle, especially a truck, the only positions with low height are the wheels. Thus, the area for analysis that previously has been calculated is scanned for low disparity/height values. If a cluster of low values beneath a suitable threshold is found, this is construed by the method via the processing unit to indicate a presence of a wheel/axle. If the cluster contains values beneath another even lower threshold, this is construed by the method via the processing unit to indicate that the wheel is in contact with the ground and thus not raised. If the cluster fails to contain these low values, this is construed by the method via the processing unit to indicate a raised axle.

Thus, the method step 516 may include the step of determining several height disparity values of the moving object where clusters of disparity values lower than a first threshold indicates the presence of a characteristic, e.g. the presence of a wheel corresponding to a presence of an axle.

Accordingly, the characteristic C of the moving object is determined by determining several height disparity values of the moving object where clusters of disparity values lower than a first threshold indicates the presence of a wheel (or axle).

In this type of configuration of the method, it is to be noted that if the cluster includes values lower than a second threshold, the method can further be configured to indicate that the wheel of the moving object (vehicle) is in contact with the ground.

Typically, the several height disparity values of the moving object (vehicle) are determined from the first image, second image and/or combination of the first and second images captured by the second stereoscopic sensor 100*b* prior to producing a second height image thereof. As is well-known in the art, the disparity values are calculated from differences in positions of contrasts in the first and second image. The disparity value is equal to the height value, but it has not yet been moved to the correct position in the height position, e.g. a pole seen slightly from the side will have several disparity values, but in the height image the disparity values will all be transformed to one position with only the greatest disparity/height value visible. This means that e.g. the side of a trailer will have many disparity values including the disparity values for the wheels, while in the height image they will all be covered by the height from the roof.

One reason for making this analysis on the disparity values instead of the height image is that the disparity values will be moved to their correct 3D positions and the height image is a view of those 3D positions strictly from above where the wheels and side of the vehicle will be hidden by the height values from the vehicle's roof.

In addition, or alternatively, the method may be configured to perform the analysis of method step 516 by background removal. In this type of analysis, an algorithm correlating to a model of the road is kept in a memory, wherein the model contains intensity values for the road under different light conditions and the positions of contrasts etc. The calculated area for analysis in the first and/or second image will have the background removed according to the background model. The areas that are still left in the lowest part of the analysis area are then good candidates for wheels/axles.

In addition, or alternatively, the method may be configured to perform the analysis in method step 516 by using algorithms that try to find circles or parts of circles that would indicate wheels/axels.

There could be several other ways to detect wheels/axles and/or other interesting features in this calculated area for analysis in the first and/or second image of the stereoscopic sensor that is calculated to have the best side view of this area.

Moreover, in a situation when it is interesting to distinguish between a truck and a bus, the method may be configured in the method step 516 to search for horizontal lines, which at some heights could indicate windows and thus an increased probability of a bus. Likewise, lower horizontal lines could indicate the ground clearance and, if that is high and over the wheels, it is probably an indication of a vehicle in the form of a truck. On the other hand, if it is low and not completely over the wheels, it is more likely to be a bus.

In an example embodiment when the characteristic refers the detection of window angles, the analysis in method step 516 may be performed with pattern matching or background removal when the vehicle is at the optimal position.

In an example embodiment when the characteristic refers the detection of items attached to the vehicle, the analysis in method step 516 may be done by pattern matching or analyzing the smoothness of roof lines and rears etc.

After a completion of the method step 516, data relating to the determination of the characteristic, e.g. the determination of a certain number of axles on the vehicle, can be transmitted to a memory for further use. As an example, the determination of a certain number of axles can be used in road tolling system to classify the vehicle in order to decide the applicable toll fee of the vehicle.

Optionally, although strictly not required, the method may further comprise a method step 502 of pre-determining whether a vehicle exceeds a predetermined activation value such as minimum height value, a minimum length value or a minimum number of vehicle axles. In this step, the method may, as an example, be configured to compare the vehicle with known minimum dimensions of vehicles having more than two axles. This method step is typically performed prior to method step 504 relating to capturing first and second images by any one of the stereoscopic sensors 100, 100b.

Figure 5B:
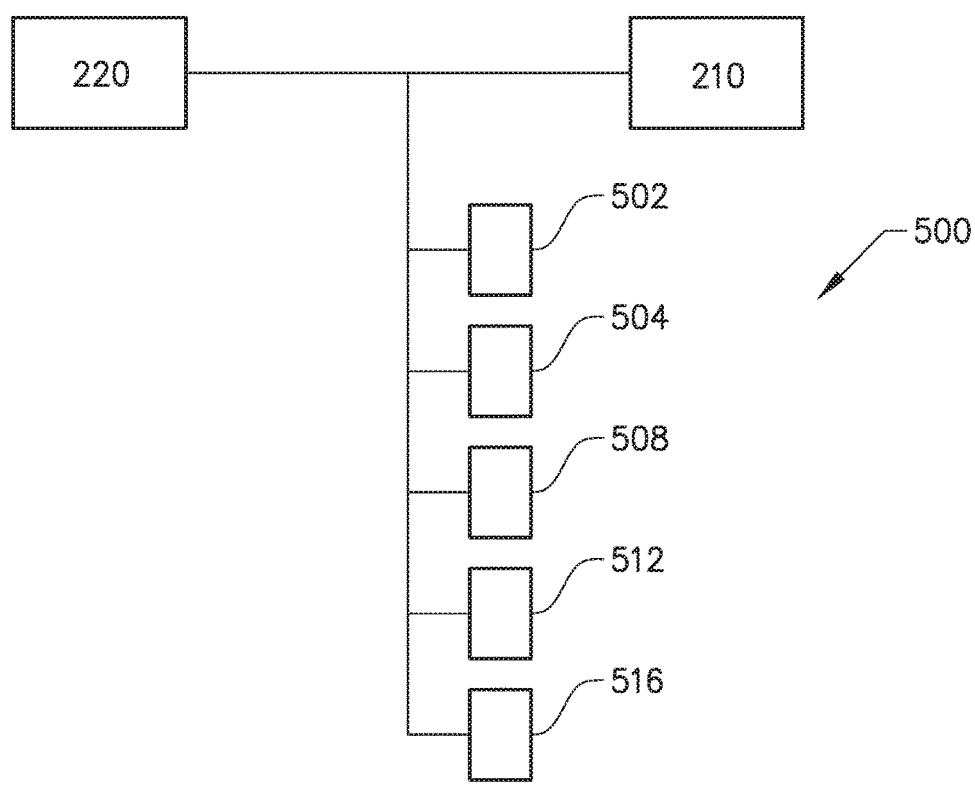
FIG. 5b is a graphic representation of a method for controlling the traffic surveillance system according to an example embodiment.

In an example embodiment where the method is configured to include the method step 502, as shown in FIG. 5b, the method step 516 of analysing a part of a primary view of a first image, a second image and/or a combination of the first and second images captured by a second stereoscopic sensor (based on the detected moving object in the first height image to determine a characteristic of the moving object) can be activated when a vehicle exceeds the predetermined activation value. However, it should be readily appreciated that the method step 516 may be initiated in other ways. Typically, the processing unit 210 is configured to initiate method step 516, i.e. an analysis of a part of a primary view of a first image, a second image and/or a combination of the first and second images captured by a second stereoscopic sensor, when a moving object has been detected in the first height image via the method step 512. In addition, or alternatively, the processing unit 210 may be configured to initiate an analysis of part of a primary view of a first image, a second image and/or a combination of the first and second images captured by a second stereoscopic sensor upon a request from the processing unit 210 and/or the operator of the system 200.

Further, it is to be noted that in this example embodiment, and in other example embodiments, the method may optionally, although not strictly required, comprise the step of processing a first image and a second image from at least the second stereoscopic sensor to produce a second height image therefrom by means of the processing unit.

Figure 3:
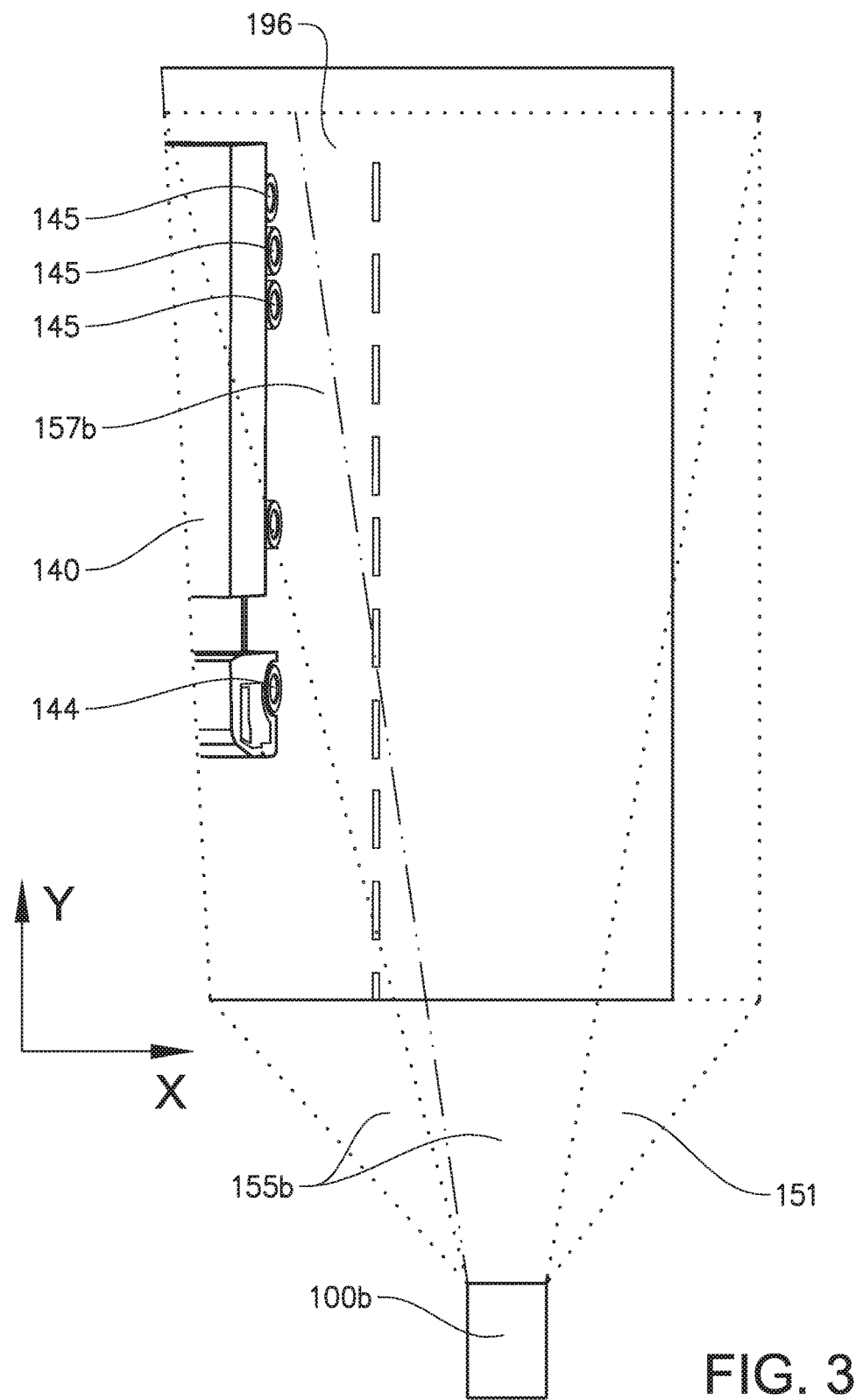

FIG. 3 illustrates an image from a stereoscopic sensor according to an example embodiment of the present disclosure. As an example, this refers to a first image captured by the second stereoscopic sensor 100b. More specifically, the vehicle 140 is here located in the side area of the image, as seen in the longitudinal direction X. The side view is part of the primary view of the captured image, and more specifically the secondary view of the captured image. As shown in FIG. 3, the primary view here corresponds to the primary coverage 155b, as described herein. In other words, the secondary view of the captured image here corresponds to the secondary coverage 157b. The vehicle 140 in FIG. 3 is further driving on the traffic lane 196. In other words, the vehicle is located in the side view of the primary view of the image, or as previously mentioned in a part of the primary view of the first image captured by the second stereoscopic sensor 100b. As is readily appreciated from FIGS. 1a and 1b, the main moving object to be monitored by the second stereoscopic sensor 100b is vehicle 141 (although not shown in FIG. 3). By performing the steps of the method as described herein, it becomes possible to detect the vehicle 140 via the method step 512 and thereafter via an analysis of the image, as shown in FIG. 3, to further determine the number of axles of the vehicle 140 by method step 516. As may be gleaned from FIG. 3, the vehicle 140 is a truck having a total set of five wheels (on each side), corresponding to a total set of five axles.

Besides axle detection, the method may from this analysis of the image further determine axle distances and/or if an extra axle is used that can be raised or lowered.

Figure 6:
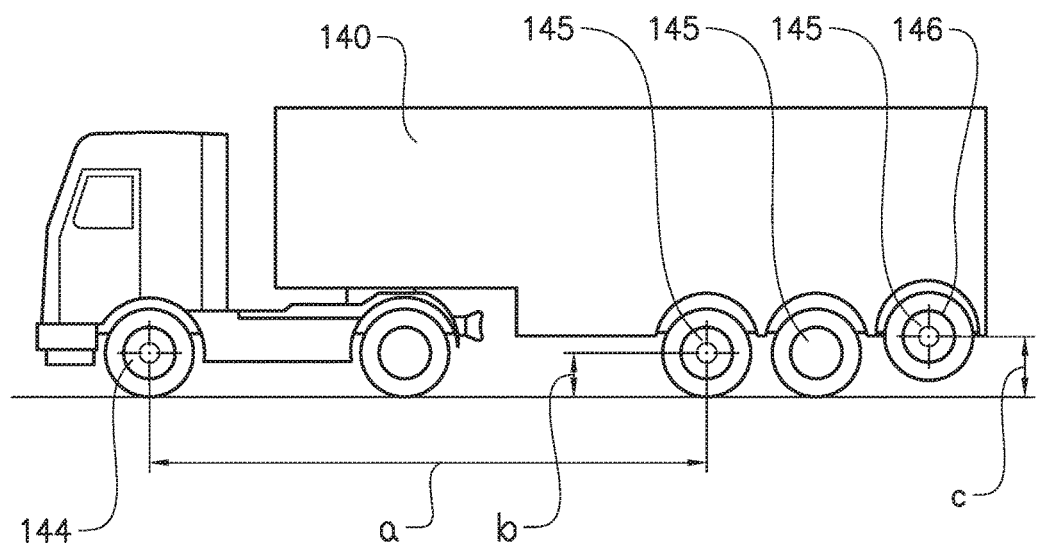
FIG. 6 is a side view of a vehicle illustrating further details about a certain characteristic of the vehicle, which is capable of being determined by a method according to an example embodiment.

Examples of some characteristics of a vehicle that can be determined by a method according to an example embodiment are illustrated in FIG. 6. FIG. 6 shows a side view of the vehicle 140 including a front axle 144 and a set of rear axles 145. In this Figure, one of the rear axles 146 is in a raised position. As an example, the characteristic of the vehicle 140 determined by the method, as described in relation to the previous figures, can correspond to the number of axles, the axle distance a, the distance b between the ground surface 191 and the centre of the axle b, and/or the distance c between the ground surface 191 and the raised axle 146. However, several different characteristics of the vehicle are conceivable to be determined by the method as mentioned above. As another example, a characteristic of the moving object (vehicle) may refer to a position of a tire of the vehicle corresponding to the vehicle axle of the vehicle as seen in a three-dimensional Cartesian coordinate system.

Furthermore, in a traffic situation when the relevant vehicle is obscured by another vehicle so that the characteristic of the vehicle is invisible in the image captured by a stereoscopic sensor (e.g. the second sensor), the method is capable of finding the most optimal captured image to analyse due to that the first stereoscopic sensor is capable to determine the exact position of the vehicle as seen in a three-dimensional Cartesian coordinate system.

As such, in all example embodiments as described herein, and in other example embodiments, the method may, via the step 508 of producing a first height image from the images of the first stereoscopic sensor and the step 512 of analysing the first height image to detect the vehicle located within the primary view, identify whether the vehicle is obscured by another vehicle or object, and determine if the obscuring vehicle prevent the characteristic of the vehicle to be accurately determined so as to evaluate and decide which one of the available images that should be analysed based on the detected vehicle in the first height image from the first sensor.

Figure 4:
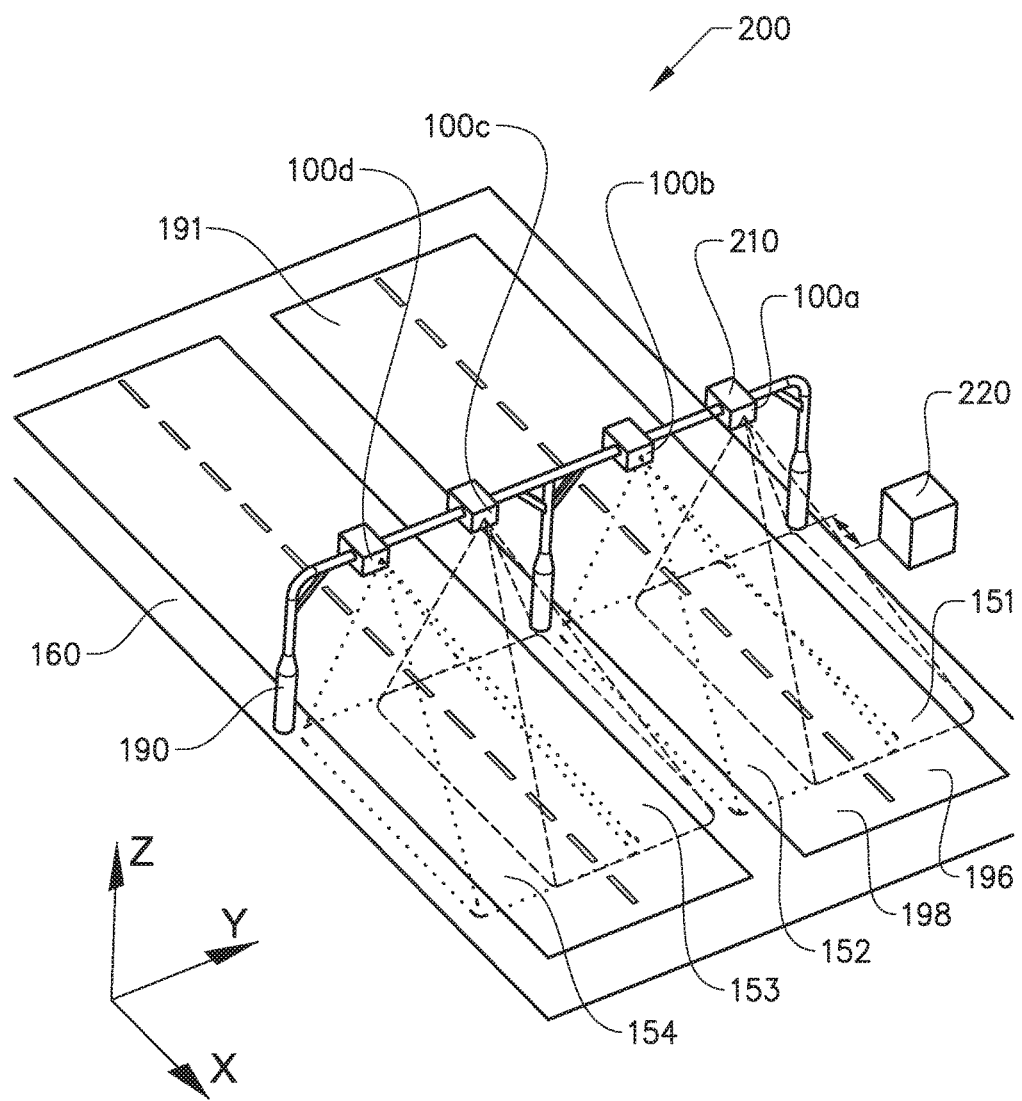

FIG. 4 schematically illustrates a traffic surveillance system operable by a method according to an example embodiment, in which the system is provided with more than two stereoscopic sensors. In this example embodiment, the system and the method may be arranged to monitor several traffic lanes 196, 198 etc. In other words, each stereoscopic sensor 100*a*, 100*b*, 100*c* and 100*d* is arranged to monitor a traffic lane and a part of an adjacent traffic lane, respectively. The surveillance plane 160 is located at a road surface 191, such that the height of the surveillance plane coincides with the height of the road relative the stereoscopic sensors 100*a*, 100*b*, 100*c*, 100*d* etc. The road is here divided into four lanes, and the stereoscopic sensors are located on a gantry 190 above the road. Each stereoscopic sensor is arranged above a traffic lane, and configured to monitor that particular lane, with the projected mounting position of each stereoscopic sensor being located at the road directly beneath the sensor. Each stereoscopic sensor 100*a*, 100*b*, 100*c*, 100*d* of the system 200 defines a main surveillance zone 151, 152, 153, 154, respectively. As with the main surveillance zones shown in FIGS. 1*a*, 1*b* and 2, a total main surveillance zone is formed by the zones 151, 152, 153 and 154 defined by the plurality of the stereoscopic sensors, respectively.

Accordingly, in this type of configuration of the system and the method, the system 200 is arranged to define and monitor a total surveillance zone such that each stereoscopic sensor is capable of monitoring a predetermined road section in the total surveillance zone via the primary coverage. As mentioned above in relation to the example embodiment shown in FIG. 2, an area of an adjacent road section in the surveillance zone may be monitored via the secondary coverage of the primary coverage of the sensor. Thus, due to the characteristic of the stereoscopic sensor, each stereoscopic sensor can be configured by the method to monitor a predetermined road section and an area of an adjacent road section.

The example embodiment in FIG. 4 may include any one of the features, functions, effects and method steps as described in relation to FIGS. 1*a*-1*b*, 2, 3, 5 and 6. The only additional feature in the example embodiment in FIG. 4 is that the system further comprises a third stereoscopic sensor 100*c* connected to the processing unit 210. Besides that the third stereoscopic sensor 100*c* is directed to monitor another surveillance zone, the third stereoscopic is configured similar to the first stereoscopic sensor and the second stereoscopic sensor. In addition, the system 200 may further include a central control unit 220 configured for receiving data from several stereoscopic sensors and possibly from several sub-processing units being individually dedicated to the stereoscopic sensors 100*a*, 100*b*, 100*c*.

Thanks to the method as described in relation to the example embodiments, the operations of traffic surveillance system are improved so that the stereoscopic sensors are controlled to interact with each other in order to detect a moving object by one sensor and, based on data relating to this operation, i.e. the detected object, to identify the most optimal image among the captured images of the other sensors of the system so as to determine a characteristic of the vehicle in a reliable and precise manner, as is further described hereinafter. In this manner, it becomes possible to more accurately acquire information about a certain characteristic of the vehicle. Thereby, a method is provided according to the example embodiments which allows for a simple, yet reliable and precise, determination of a characteristic relating to a vehicle.

Although the present patent application has been described in relation to specific combinations of specific stereoscopic sensors, it should be readily appreciated that more than two stereoscopic sensors can be included in the traffic surveillance system and the stereoscopic sensors may be combined in other configurations as well which is clear for the skilled person when studying the present application. Thus, the above description of the example embodiment and the accompanying drawings are to be regarded as a non-limiting example of the present patent application and the scope of protection is defined by the appended claims. Any reference sign in the claims should not be construed as limiting the scope.

The invention claimed is:

1. A method of controlling a traffic surveillance system, the system having a plurality of stereoscopic sensors connected to a processing unit, wherein each of the plurality of stereoscopic sensors comprises a first camera and a second camera, wherein each first camera of the plurality of stereoscopic sensors is configured to capture a first image and each second camera of the plurality of stereoscopic sensors is configured to capture a second image, the first image and the second image being capable of being processed into a height image by the processing unit, and each stereoscopic sensor of the plurality of stereoscopic sensors being further configured to define and monitor a main surveillance zone defining a primary coverage in a surveillance plane at a predetermined distance from the stereoscopic sensor, such that any one of the captured first image, the captured second image and the processed height image includes a primary view corresponding to the primary coverage of the stereoscopic sensor, the method comprising:

capturing first images and second images over time by the plurality of stereoscopic sensors;

processing, by the processing unit, a first image from a first camera of a first stereoscopic sensor of the plurality of stereoscopic sensors and a second image from a second camera of the first stereoscopic sensor of the plurality of stereoscopic sensors to produce a first height image;

analysing said first height image to detect a moving object located within the primary view of the first stereoscopic sensor;

determining a position of the moving object with respect to the surveillance plane;

determining a second stereoscopic sensor of the plurality of stereoscopic sensors having a side view of the moving object based on the determined position, wherein the side view overlaps the primary view; and analysing a part of the primary view of at least a first image captured by a first camera of the second stereoscopic sensor based on the detected moving object in said first height image to determine a characteristic of the moving object.

2. The method according to claim 1, wherein the characteristic is a number of axles of the vehicle, a presence of windows, a ground clearance, an angle of the front window or an indication of objects attached on top of or behind the vehicle.

3. The method according to claim 1, wherein a primary coverage in a surveillance plane of at least the first stereoscopic sensor overlaps a primary coverage in a surveillance plane of the second stereoscopic sensor.

4. The method according to claim 1, further comprising:
determining the characteristic of the moving object based on pattern matching with one or several statistical models of the moving object.

5. The method according to claim 4, wherein any one of the statistical models is based on at least one of standard height levels, standard length levels, standard width levels, cabin size, fingerprinting information, license plate information, or weather condition information.

6. The method according to claim 1, wherein the characteristic of the moving object is determined by determining several height disparity values of the moving object where clusters of disparity values lower than a first threshold indicate the presence of an axle.

7. The method according to claim 6, further comprising:
indicating the wheel of the moving object is in contact with the ground in response to the cluster including values lower than a second threshold.

8. The method according to claim 6, wherein the several height disparity values of the moving object are determined from the first image captured by the first camera of the second stereoscopic sensor, a second image captured by the second stereoscopic sensor, or a combination of the first image and the second image captured by the second stereoscopic sensor prior to producing a second height image.

9. The method according to claim 1, wherein each stereoscopic sensor of the plurality of stereoscopic sensors is arranged to monitor a traffic lane so that the system is configured to monitor a plurality of traffic lanes.

10. The method according to claim 1, wherein at least part of the primary coverage of each stereoscopic sensor of the plurality of stereoscopic sensors is directed towards a predictable vehicle axle region of the vehicle.

11. The method according to claim 1, further comprising:
pre-determining whether a vehicle exceeds a predetermined activation value.

12. The method according to claim 11 wherein analysing a part of the primary view of at least the first image captured by the second stereoscopic sensor of the plurality of stereoscopic sensors is activated when a vehicle exceeds the predetermined activation value.

13. The method according to claim 1, wherein the plurality of stereoscopic sensors is mounted upon a gantry and configured to define the surveillance plane upon a road surface below the gantry.

14. The method according to claim 1, further comprising:
determining a number of axles of a vehicle.

15. A processing unit for a traffic surveillance system configured for implementing the method according to claim 1.

16. The method according to claim 1, wherein the moving object is a vehicle.

17. The method according to claim 11, wherein the predetermined activation value is a minimum height value, a minimum length value, or a minimum number of vehicle axles.

18. A method of controlling a traffic surveillance system, the system having a plurality of stereoscopic sensors connected to a processing unit, wherein each of the plurality of stereoscopic sensors comprises a first camera and a second camera, wherein each first camera of the plurality of stereoscopic sensors is configured to capture a first image and each second camera of the plurality of stereoscopic sensors is configured to capture a second image, the first image and the second image being capable of being processed into a height image by the processing unit, and each stereoscopic sensor of the plurality of stereoscopic sensors being further configured to define and monitor a main surveillance zone defining a primary coverage in a surveillance plane at a predetermined distance from the stereoscopic sensor, such that any one of the captured first image, the captured second image and the processed height image includes a primary view corresponding to the primary coverage of the stereoscopic sensor, the method comprising:
capturing first images and second images over time by the plurality of stereoscopic sensors;
processing, by the processing unit, a first image from a first camera of a first stereoscopic sensor of the plurality of the stereoscopic sensors and a second image from a second camera of the first stereoscopic sensor of the plurality of stereoscopic sensors to produce a first height image;
analysing said first height image to detect a moving object located within the primary view of the first stereoscopic sensor;
determining a position of the moving object with respect to the surveillance plane;
determining a second stereoscopic sensor of the plurality of stereoscopic sensors having a side view of the moving object based on the determined position, wherein the side view overlaps the primary view; and
analysing a part of the primary view of at least a combination of a first image captured by a first camera of the second stereoscopic sensor and a second image captured by a second camera of the second stereoscopic sensor based on the detected moving object in said first height image to determine a characteristic of the moving object.

19. The method according to claim 18, further comprising:
pre-determining whether a vehicle exceeds a predetermined activation value, wherein said analysing the part of the primary view of at least the combination of the first image captured by the first camera of the second stereoscopic sensor and the second image captured by the second camera of the second stereoscopic sensor is activated when a vehicle exceeds the predetermined activation value.

20. A method of controlling a traffic surveillance system, the system having a plurality of stereoscopic sensors connected to a processing unit, wherein each of the plurality of stereoscopic sensors comprises a first camera and a second camera, wherein each first camera of the plurality of stereoscopic sensors is configured to capture a first image and each second camera of the plurality of stereoscopic sensors is configured to capture a second image, the first image and the second image being capable of being processed into a height image by the processing unit, and each stereoscopic sensor of the plurality of stereoscopic sensors being further configured to define and monitor a main surveillance zone defining a primary coverage in a surveillance plane at a predetermined distance from the stereoscopic sensor, such that any one of the captured first image, the captured second image and the processed height image includes a primary view corresponding to the primary coverage of the stereoscopic sensor, the method comprising:
  capturing first images and second images over time by the plurality of stereoscopic sensors;
  processing, by the processing unit, a first image from a first camera of a first stereoscopic sensor of the plurality of stereoscopic sensors and a second image from a second camera of the first stereoscopic sensor of the plurality of stereoscopic sensors to produce a first height image;
  analysing said first height image to detect a moving object located within the primary view of the first stereoscopic sensor;
  determining a position of the moving object with respect to the surveillance plane;
  determining a second stereoscopic sensor of the plurality of stereoscopic sensors having a side view of the moving object based on the determined position, wherein the side view overlaps the primary view; and
  analysing a part of the primary view of at least an image captured by the second stereoscopic sensor based on the detected moving object in said first height image to determine a characteristic of the moving object.

* * * * *